United States Patent [19]

Yamada et al.

[11] Patent Number: 4,646,890
[45] Date of Patent: Mar. 3, 1987

[54] ONE-WAY CLUTCH MOUNTING MEANS FOR AUTOMATIC TRANSMISSIONS

[75] Inventors: Yoshihiro Yamada; Mutsumi Kawamoto; Tatsuya Iwatsuki, all of Anjo; Koujiro Kuramochi, Toyota, all of Japan

[73] Assignees: Aisin-Warner Ltd; Toyota Motor Corp., both of Aichi, Japan

[21] Appl. No.: 659,524

[22] Filed: Oct. 10, 1984

[30] Foreign Application Priority Data

Oct. 11, 1983 [JP] Japan ................................ 58-190357

[51] Int. Cl.4 ............................................ F16D 41/00
[52] U.S. Cl. ................................ 192/30 V; 192/41 R; 192/45; 192/106.1
[58] Field of Search ..................... 192/30 V, 41 R, 45, 192/70.2, 70.17, 106.1, 109 R; 74/409

[56] References Cited

U.S. PATENT DOCUMENTS 2,382,331  8/1945  Peterson et al. ...................... 192/45
2,843,238  7/1958  Rozner .................................. 192/45
4,433,770  2/1984  Loizeau et al. .................. 192/70.17
4,470,494  9/1984  Takeuchi .......................... 192/70.17

FOREIGN PATENT DOCUMENTS 0167525  10/1982  Japan ................................. 192/30 V
1233273   5/1971  United Kingdom ............. 192/106.2

Primary Examiner—Rodney H. Bonck
Assistant Examiner—Alan G. Towner
Attorney, Agent, or Firm—Pahl, Lorusso & Loud

[57] ABSTRACT

A one-way clutch biasing means for an automatic transmission, comprising: an inner spline formed on a one-way clutch retaining member; an outer spline formed on the outer race of the one-way clutch and loosely meshed with the inner spline; and a resilient member fitted between a side wall surface of the inner spline of the retaining member and an opposing side wall surface of the outer spline of the outer race to urge the outer race constantly in the locking direction of the one-way clutch.

2 Claims, 4 Drawing Figures

ONE-WAY CLUTCH MOUNTING MEANS FOR AUTOMATIC TRANSMISSIONS

BACKGROUND OF THE INVENTION (i) Field of the Invention

This invention relates to a mounting means to be used for mounting a one-way clutch (or a one-way brake) in an automatic transmission of motor vehicle.

2. Description of the Prior Art

The one-way clutch of a 4-speed automatic transmission of motor vehicle has one of its outer and inner races either coupled with or integrally formed with a rotational member, and has the other race retained in a stationary or rotating support member of the one-way clutch. The latter race and support member are usually coupled with each other through splines of a loose fit to enhance the assembling efficiency and prevent uneven application of external forces on the race in engagement with the support member Therefore, when reversing the one-way clutch to a locking (operating) direction from a free (disengaged) direction, the splined portions of the race, which have been displaced in one direction by sliding friction in the free state due to the existence of the play (loose fit), are abruptly moved in the opposite direction, thereby impacting on the splined surfaces.

SUMMARY OF THE INVENTION

It is an object of the present invention to provide a mounting means to be used for mounting a one-way clutch in an automatic transmission, which is arranged to press the outer race of the one-way clutch constantly in the locking direction to prevent impact between a support member and the mating race of the one-way clutch when reversing same from free to locked state.

According to the present invention, there is provided a one-way biasing means to be used in mounting a one-way clutch in an automatic transmission, which essentially comprises: an inner spline formed on a one-way clutch retaining member; an outer spline formed on the outer race of the one-way clutch and loosely fitted in the inner spline of the retaining member; and resilient member fitted between a side wall surface of the inner spline on the retaining member and an opposing side wall surface of the outer spline on the outer race and urging the outer race constantly in the locking direction of the one-way clutch.

The above and other objects, features and advantages of the invention will become apparent from the following description and appended claims, taken in conjunction with the accompanying drawings which show by way of example a preferred embodiment of the invention.

DESCRIPTION OF PREFERRED EMBODIMENTS

Figure 1:
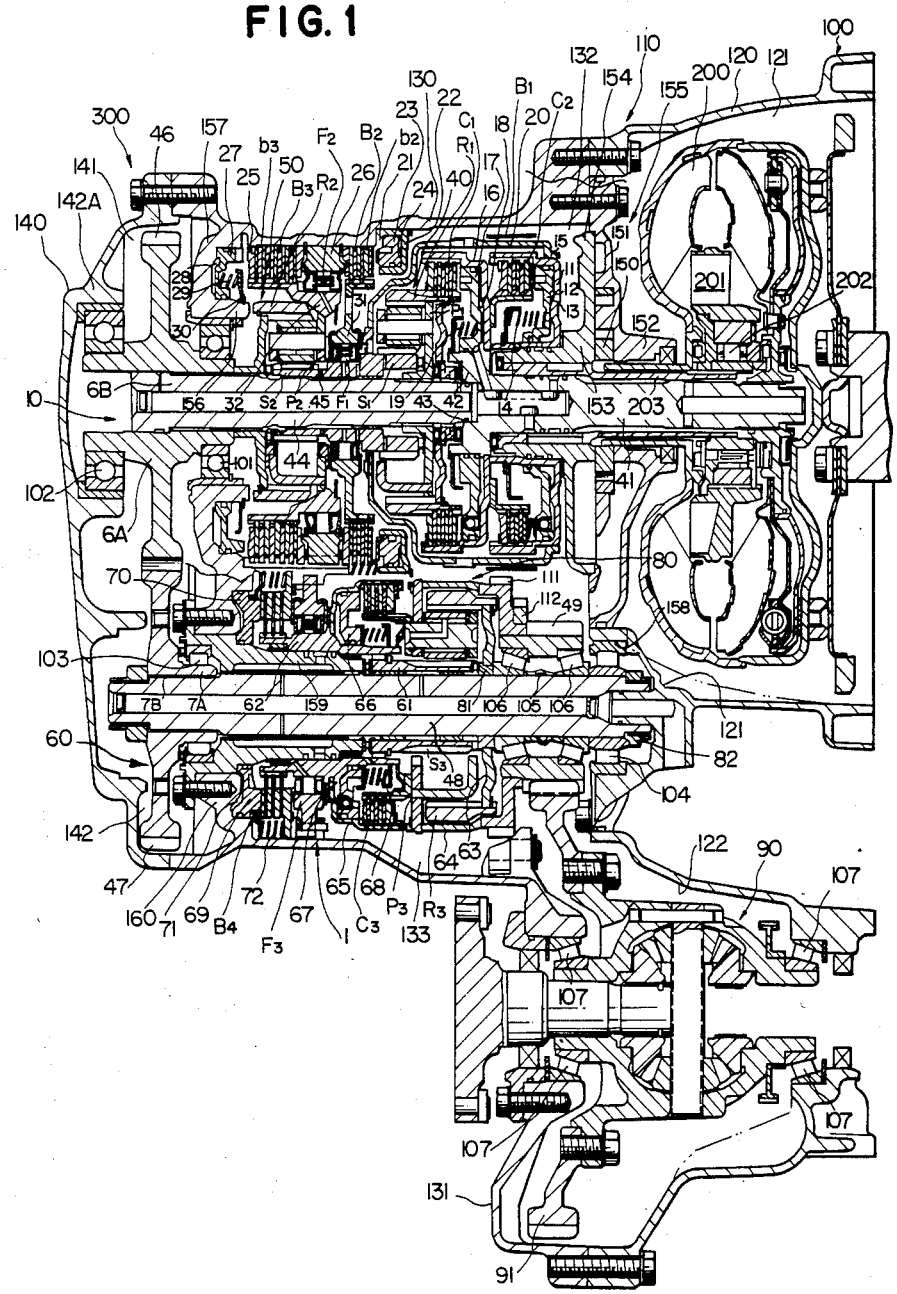
FIG. 1 is a sectional view of an automatic transmission incorporating a one-way mounting means according to the present invention.
Figure 2:
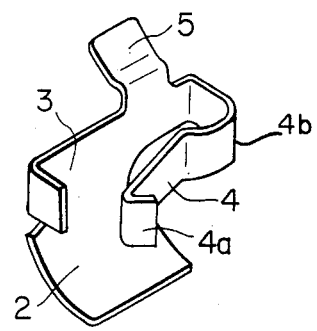
FIG. 2 is a perspective view of a resilient member.

Now, the invention is described more particularly by way of a preferred embodiment shown in the drawings. Referring to FIGS. 1 and 2, there are shown an automatic transmission and a one-way clutch mounting means according to the present invention.

The automatic transmission generally indicated at 100 includes a fluid type torque converter 200, a transmission 300, and a hydraulic control system which is not shown.

The transmission 300 includes: a first underdrive planetary gear shift mechanism 10 with three-forward and one-reverse speed positions, including a first planetary gear set 40, a second planetary gear set 50, a pair of multi-disk clutches C1 and C2 which are operated by a hydraulic servo, a belt brake B1, a couple of multi-disk brakes B2 and B3, and a couple of one-way clutches F1 and F2; a second underdrive planetary shift mechanism 60 including a third planetary gear set 80, a multi-disk clutch C3 which is operated by a hydraulic servo, a multi-disk brake B4, and a one-way clutch F3; and a differential mechanism 90.

The case 110 of the automatic transmission includes: a front case 120 integrally forming the chambers for accommodating the torque converter 200 and differential 90; a main case 130 integrally forming the chambers for accommodating the first underdrive planetary gear shift mechanism 10, second underdrive planetary gear shift mechanism 60 and rear cover 131 of the differential; and a rear cover 140 accommodating the output gear 46 of the first underdrive planetary gear shift mechanism 10 and the input gear 47 of the second underdrive planetary gear shift mechanism 60, and closing the rear side of the automatic transmission. The front case 120, main case 130 and rear cover 140 are fastened to each other by a suitable number of bolts.

The torque converter 200 is accommodated in a torque converter chamber 121 which is open on the front side (on the side of the engine). Between the torque converter chamber 121 and a cylindrical transmission chamber 132 which is contiguously extended rearward of the torque converter chamber 121, an oil pump front cover 151, in the form of an annular plate which receives therein an oil pump 150 and which is provided with a forwardly extending cylindrical portion 152, is fastened to the main case 130. Fastened to the rear side of the front cover 151 is an oil pump cover 154 which is provided with a cylindrical front center support 153 projecting rearward concentrically with the above-mentioned cylindrical portion 152, the front and rear covers 151 and 140 forming a partition wall 155 between the torque converter chamber 121 and transmission chamber 132. Further, an intermediate support wall 157 with a forwardly projecting cylindrical center support 156 is provided in a rear portion of the transmission chamber 132. The partition wall 155 and intermediate support wall 157 define therebetween the transmission chamber 132, while the intermediate support wall 157 and rear cover 140 define therebetween an output gear chamber 141 of the transmission. The rear cover 140 is provided with a forwardly projecting cylindrical center support 142A coaxial with the front center support 153.

A cylindrical underdrive chamber 133 is provided on one side of the cylindrical transmission chamber 132 in parallel relationship therewith. Centrally in front of the underdrive chamber 133, a hole-like front center support 158 is provided in the torque converter chamber 121 of the front case 120, and, in the rear portion of the chamber 133, there is provided an intermediate support wall 160 to which a forwardly projecting long cylindrical center support 159 is fastened by bolts. The rear cover 140 and intermediate support wall 160 define therebetween the input chamber 142 of the underdrive mechanism, while the intermediate support wall 160 and torque converter chamber 121 define therebetween the underdrive chamber 133.

Fitted in the front center support 153 is a stationary shaft 203 of the one-way clutch 202, which supports the stator 201 of the torque converter 200. The input shaft 41 of the transmission, which is the output shaft of the torque converter 200, is rotatably supported in the stationary shaft 203. The input shaft 41 is formed with a larger diameter rear end portion 42 which projects rearward from the front center support 153. The rear end portion 42 is centrally formed with a rearwardly open hole 43. A first intermediate transmission shaft 44 is rotatably mounted behind the input shaft 41 in series therewith. The first intermediate shaft 44 has its fore end held in sliding contact with the hole 43, and has its rear end fitted through splines in the hole 6B of the cylindrical portion 6A at the center of the output gear 46. The cylindrical portion 6A of the output gear 46 is supported in the center support 156 and rear center support 142A through bearings 101 and 102. A sun gear shaft 45 is rotatably fitted on the intermediate shaft 44 in a front portion thereof through a bearing.

An underdrive input gear 47 which is meshed with the afore-mentioned output gear 46 has its central cylindrical portion 7A supported by the center support 159 through a roller bearing 103, with the hole 7B of the cylindrical portion 7A being fitted through splines on the rear end portion of a second intermediate transmission shaft 48 which extends through the center of the underdrive chamber 133. This transmission shaft 48 of a rod-like shape is provided with a flange-like projection 81 in an intermediate portion on the side of its fore end and internally formed with an oil passage. The fore end of the transmission shaft 48 is supported in an annular center support 158 through a roller bearing 104. An output gear 49 (of the multi-speed transmission consisting of the shift mechanism 10 and underdrive planetary gear mechanism 60) is supported between the roller bearing 104 and flange-like projection 81 on the transmission shaft 48 through a pair of tapered roller bearings 106 which are assembled with and grip therebetween a spring material 105 with a pressure as preadjusted by a nut 82 tightened on the fore end. The output gear 49 is meshed with a large drive gear 91 of the differential 90.

Further, a cylindrical sun gear shaft 61 is rotatably supported between the flange-like projection 81 and center support 159 on the transmission shaft 48 through a bearing. A cylindrical inner race shaft 62 is rotatably supported on the center support 159 through a bearing, and has its fore end portion fitted on a rear end portion of the sun gear shaft 61 through splines.

In the front portion of the transmission chamber 132, a first hydraulic servo drum 11 which is open on its rear side is rotatably fitted on the front center support 153, and receives an annular piston 12 between its inner and outer peripheral walls to form a hydraulic servo 13 for the clutch C2, mounting a return spring 14 and clutch C2 on the inner peripheral wall and on the inner side of the outer peripheral wall of the drum 11. On the rear side of the first hydraulic servo drum 11, a second servo drum 16 which is open on its rear side and provided with an annular projection 15 on the front side is fixedly mounted on a rear end portion 42 of the input shaft 41. An annular piston 17 is fitted between the rear end portion 42 and the outer peripheral wall of the drum 16 to form a hydraulic servo 18 for the clutch C1, mounting a return spring 19 and clutch C1 on the inner peripheral wall and on the inner side of the outer peripheral wall of the drum 16, respectively. Further, the clutch C2 is mounted on the outer periphery of the annular projection 15, connecting the first and second hydraulic servo drums 11 and 16 through the clutch C2. Provided on the rear side of the second hydraulic servo drum 16 is the first planetary gear set 40, of which the ring gear R1 is connected to the second hydraulic servo drum 16 through the clutch C1, the carrier P1 is fitted on a fore end portion of the first intermediate transmission shaft 44 through splines, and the sun gear S1 is provided integrally with the sun gear shaft 45. A connecting drum 20 which is so shaped as to cover the first and second hydraulic servo drums 11 and 16 and the first planetary gear set 40 in a minimum space is secured at its fore end to the outer side of the first hydraulic servo drum 11, and connected at its rear end to the sun gear shaft 45 behind the first planetary gear set 40. The drum 20 is further provided with a belt brake B1 on the circumference thereof.

Fixed in a residual space 21 on the outer side of the connecting drum around the first planetary gear set 40 is an annular third hydraulic servo drum 22 which is open on the rear side and receives therein a piston 23 to form a hydraulic servo 24 for the brake B2. Fitted on spline 25, which is formed on the inner side of the main case 130 behind the hydraulic servo 24, are brake disk b2 of the brake B2, outer race 26 of the one-way clutch F2 and brake disk b3 of the brake B3 in that order as viewed from the front side. Provided behind the brake B3 is a hydraulic servo 28 for the brake B3, which includes a piston 27 fitted in an annular bore formed between the case 120 and the outer peripheral wall of the center support 156 of the intermediate support wall 157. Return spring 29 of the hydraulic servo 28 is supported by a flange plate 30 which is mounted at the fore end of the center support 156. Located on the inner side of the brake B2 is the one-way clutch F1 which uses the sun gear shaft 45 as its inner race and has its outer race 31 connected to the brake B2. Mounted behind the one-way clutch F1 is the second planetary gear set 50 including a sun gear S2 formed integrally with the sun gear shaft 45, a carrier P2 connected to the inner race 32 of the one-way clutch F2 on the outer side as well as to the brake B3, and a ring gear R2 coupled with the first intermediate transmission shaft 44.

Now turning to the underdrive chamber 133, a parking gear 111 in the form of a flange-like plate of a large diameter is securely mounted at the rear end of the output gear 49, and a governor drive gear 112 is securely mounted in the gap space between the output gear 49 and parking gear 111. Provided behind the output gear 49 is the third planetary gear set 80, with a ring gear R3 connected to the projection 81 of the second intermediate transmission shaft 48 through the flange plate 63, a planetary gear P3 coupled with the parking gear 111 through the connecting drum 64, and a sun gear S3 formed on the sun gear shaft 61. Behind the third planetary gear set 80 is a fourth hydraulic servo drum 65 which is open on its front side and secured to the inner race shaft 62. An annular piston 66 is fitted between the outer peripheral wall of the drum 65 and the inner race shaft 62 to form a hydraulic servo 67 for the clutch C3. A return spring 68 is mounted on the part of the inner race shaft 62, while the clutch C3 is mounted on the inner side of the outer peripheral wall of the drum 65 for connecting the drum to the carrier P3. Provided behind the hydraulic servo drum 65 is a one-way brake F3 which uses the inner race shaft 62 as its inner race. A brake B4 is provided between the inner race shaft 62 and main case 130 at a position rearward of the one-way brake F3. A piston 70 is fitted in an annular hole 69 formed between the outer periphery of the center support 159 of the intermediate support wall 160 on the rear side of the brake B4 and the main case 130 to form a hydraulic servo 71 of the brake B4, and a return spring 72 is fitted in grooves which are formed at uniform intervals on the outer periphery of the brake B4.

Figure 3:
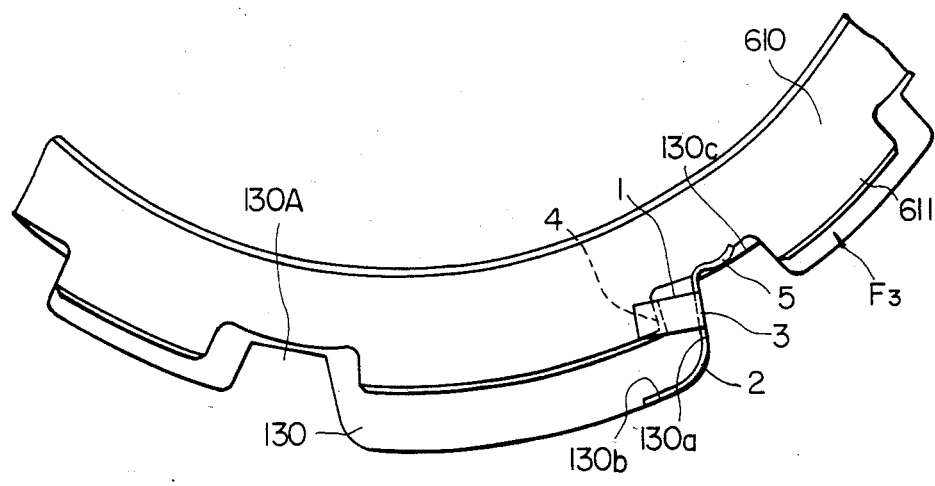
FIG. 3 is a front view showing the one-way clutch mounting means as applied to a splined portion of a one-way clutch.
Figure 4:
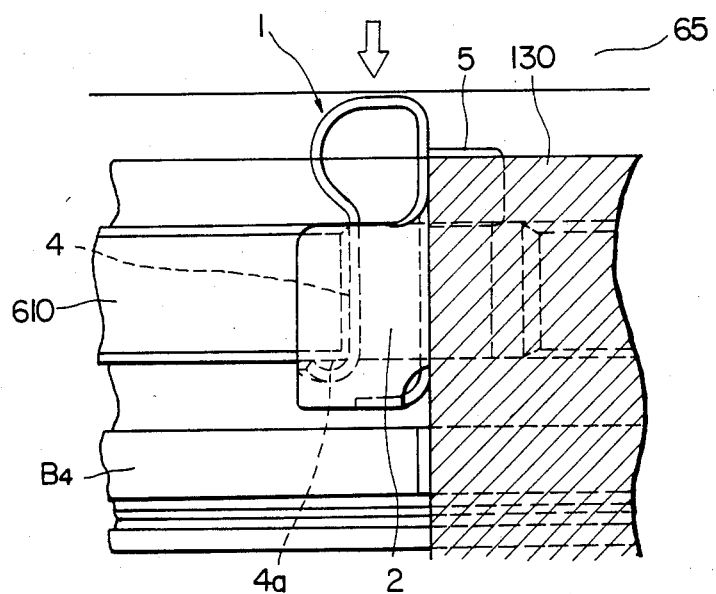
FIG. 4 is an enlarged sectional view of the one-way clutch mounting means of the invention.

Referring to FIGS. 2 to 4, there is shown a one-way clutch mounting structure which retains the one-way clutch F3 on the main case 130.

The outer spline 611 formed on the circumference of the outer race 610 of the one-way clutch F3 is fitted in the inner spline 130A on the inner periphery of the main case 130, fixing the outer race 610 of the one-way clutch F3 in one direction by a leaf spring 1 of a resilient metallic material.

The leaf spring 1 includes a curved leg portion 2 so shaped as to lie snugly on the bottom and side wall surfaces 130a and 130b of the inner spline 130A, a body portion 3 to be pressed on the bottom wall surface 130a of the inner spline 130A when mounted, a holding arm portion 4 which is extended out from the body portion 3 and folded in the axial direction in a forearm with a claw 4a at its distal end, holding the outer race 610 in the axial direction between an bulged elbow 4b and claw 4a, and a neck portion 5 which is extended in the circumferential direction from the body portion 3 for engagement with a top face 130c of a tooth of the inner spline on the main case 130.

In the particular embodiment shown, a spring load in the locking direction is applied to the outer race 610 of the one-way clutch F3 by the leaf spring 1. Since the outer race 610 is pressed in the locking direction even when the one-way clutch F3 is rotated in the free direction, no impact is imposed on the splined portions at the time of reversing the one-way clutch F3 from free to locking direction. Thus, by mounting a one-way clutch in an automatic transmission with use of the biasing means of the invention, it becomes possible to preclude the rattling noise which occurs upon reversing the one-way clutch F3 from free to locked state, namely, on a 4-3 shift when the outer race 610 collides against the inner spline 130A.

Provided on one side of the torque converter chamber 121 is a differential chamber 122 in which the differential 90 is supported by tapered roller bearings 107. A large drive gear 91 at the rear end is meshed with the aforementioned output gear 49.

The clutches and brakes of the transmission 300 are engaged or released respectively by oil pressures which are selectively supplied to the hydraulic servos of these friction elements from the hydraulic control system (not shown) according to operating conditions of a vehicle such as vehicle speed, throttle opening and the like, thereby to effect shifts to four forward speed ranges or a reverse range. The ranges which are established by operation of the respective clutches, brakes and one-way clutches are shown by way of example in the following Table 1.

TABLE 1

| Range | | C1 | C2 | C3 | B1 | B2 | B3 | B4 | F1 | F2 | F3 |
|---|---|---|---|---|---|---|---|---|---|---|---|
| Forward | | | | | | | | | | | |
| D-Range | 1st speed | E | X | X | X | X | X | E | f | (L) | L |
| | 2nd speed | E | X | X | X | E | X | E | (L) | f | L |
| | 3rd speed | E | E | X | X | E | X | E | f | f | L |
| | 4th speed | E | E | E | X | E | X | X | f | f | f |
| S | 1st speed | E | X | X | X | X | X | E | f | (L) | L |
| | 2nd speed | E | X | X | E | E | X | E | L | f | L |
| | 3rd speed | E | E | X | X | E | X | E | f | f | L |
| L | 1st speed | E | X | X | X | X | E | E | f | (L) | L |
| | 2nd speed | E | X | X | E | E | X | E | L | f | L |
| Reverse/R-range | | X | E | X | X | X | E | E | f | f | f |

In Table 1, the letter "E" indicates engagement of a clutch, brake or one-way clutch, and the bracketed letter "(L)" indicates engagement of a one-way clutch only in the state of engine drive and not in the state of engine brake. Further, the letter "L" indicates engagement of a one-way clutch or a one-way brake in the state of engine drive though it (lock) is not necessarily required since transmission of power is guaranteed by a clutch or brake which is incorporated in parallel therewith. The small letter "f" indicates a free state of a one-way clutch or a one-way brake, and the cross "X" indicates a released state of a clutch or brake.

As clear from the foregoing description, the present invention provides a one-way clutch retainer to be fitted in a splined portion of a one-way clutch of an automatic transmission to urge a race of the clutch constantly in one direction for preventing the impact which would otherwise be imposed on the splined portion at the time of a 4-3 shift.

What is claimed is:

1. A one-way clutch mounting for an automatic transmission, comprising:

an inner spline formed on a one-way clutch retining member;

an outer pline formed on the outer race of said one-way clutch and loosely meshed with said inner spline; and a leaf spring interposed between a side wall surface of said inner spline of said retaining member and an opposing side wall surface of said outer spline of said outer race to urge said outer race constantly in the locking direction of said one-way clutch, said leaf spring comprising a body portion pressed against the side wall surface of the inner spline when fitted in position, an arm portion extended out from said body portion and being folded to form an extended elbow portion and a distal claw portion, said extended elbow portion and said claw portion beig axially spaced and arranged on opposite sides of said outer race to hold said outer race therebetween.

2. The one-way clutch mounting as set forth in claim 1, wherein said leaf spring further comprises a leg portion curved to lie snugly on the bottom and side wall surfaces of the inner spline of the retaining member, and a neck portion extended in the circumferential direction from the body portion for engagement with a top surface of the inner spline.

* * * * *

UNITED STATES PATENT AND TRADEMARK OFFICE
CERTIFICATE OF CORRECTION

PATENT NO. : 4,646,890
DATED : March 3, 1987
INVENTOR(S) : Yoshihiro YAMADA, Mutsumi KAWAMOTO; Tatsuya IWATSUKI It is certified that error appears in the above—identified patent and that said Letters Patent is hereby corrected as shown below:

Col 1, line 21, insert a period --.-- after "member.
Col 6, line 43 (claim 1, line 3), "retining" should read --retaining--;
    line 45 (claim 1, line 5), "pline" should read --spline--; and
    line 58 (claim 1, line 19), "beig" should read --being--.

Signed and Sealed this

First Day of September, 1987

Attest:

DONALD J. QUIGG

*Attesting Officer*      *Commissioner of Patents and Trademarks*